Dec. 9, 1941.  E. S. RINALDY  2,265,859
PROJECTED PICTURE SELECTOR
Filed Jan. 23, 1939  4 Sheets-Sheet 3

INVENTOR.
EDWARD S. RINALDY
BY
ATTORNEY.

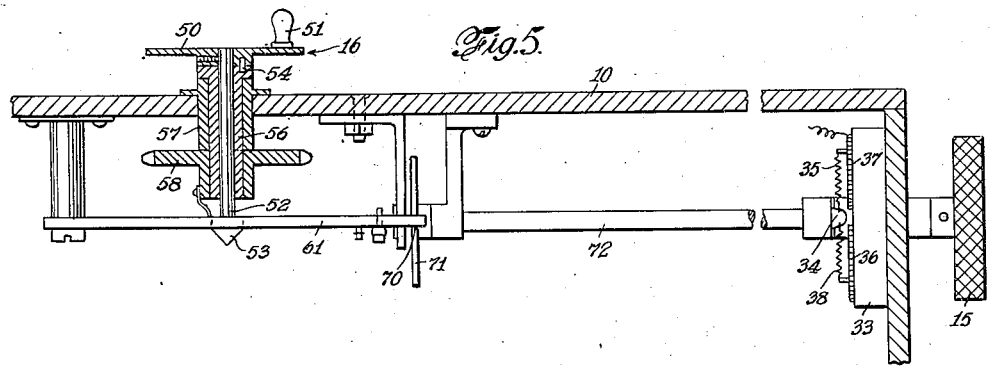
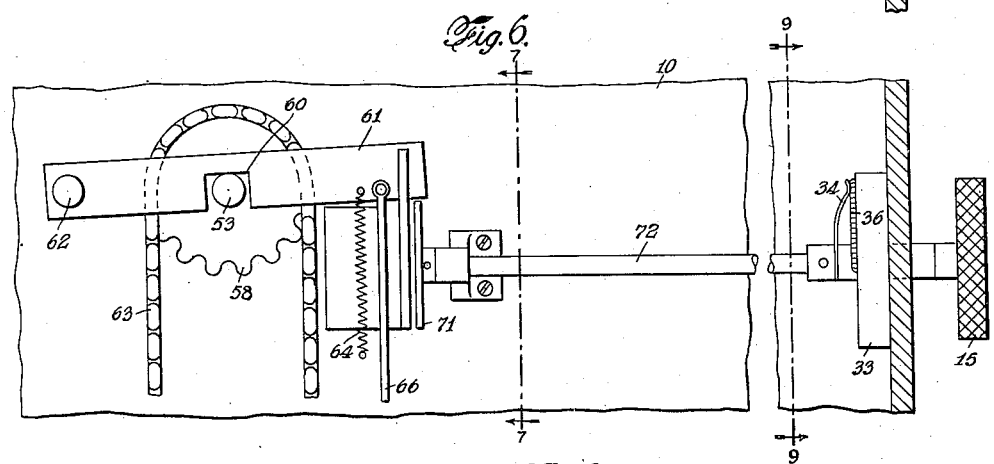
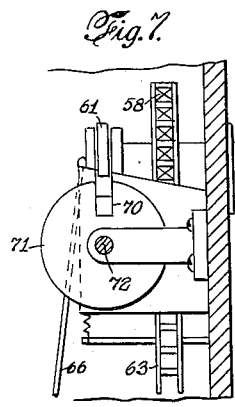
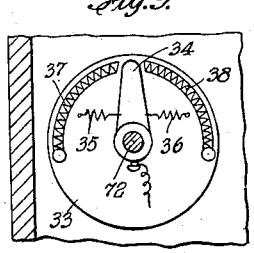
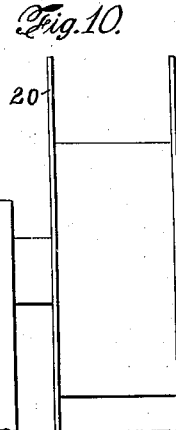
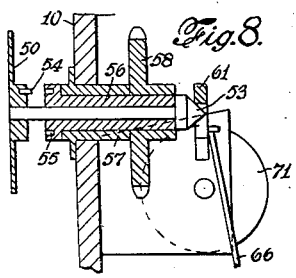

Patented Dec. 9, 1941

2,265,859

UNITED STATES PATENT OFFICE 2,265,859

PROJECTED PICTURE SELECTOR

Edward S. Rinaldy, Chester, N. J.

Application January 23, 1939, Serial No. 252,267

8 Claims. (Cl. 88—24)

The invention relates to an apparatus for selecting from among a multiplicity of data or other matter as depicted upon a motion picture film the particular picture desired and for displaying the same on an enlarged scale upon a suitable screen. In apparatus of this nature, the data is photographed on a reduced scale upon a continuous strip of film in equal size frames or groups of frames as in the case of the usual motion picture photography, and, for example, upon a standard 35 mm. film; and the film is then run in either direction and non-intermittently through a projection until the desired picture is brought into position where it is held for projection. It will be appreciated, however, that in instances where a film of any appreciable length is utilized, many thousands of such frames will have to be positioned and that consequently considerable time may be required to bring the desired data into projection position; also, that some means of readily identifying a frame for the proper location for projection must be had.

It is an object of the present invention to provide apparatus of the aforesaid nature wherein film reels bearing an almost unlimited number of frames may be utilized, and wherein the desired frame may be quickly and accurately selected and located for projection upon a screen which is preferably associated with the apparatus.

A further object of the invention is to provide means whereby an extremely rapid and approximate selection at high speed may be accomplished with final and precise manual adjustment for proper location of the desired frame.

A still further object of the invention is to provide visible means other than the frame itself to indicate a frame as it is brought into projection position.

The invention has for an object, also, to provide interlocking means whereby a film may not be advanced either at high speed or manually until it is cleared for free movement, namely: not drawn through the usual gate, so that it may be advanced in either direction, as by an electric motor, at an extremely rapid rate and without danger of tearing the film.

In carrying out the invention, suitable projection apparatus of any well known or special design may be located, for example, in the bottom of a cabinet to project an image upwardly upon a screen positioned at the top of the cabinet for convenient viewing and preferably provided with a surrounding hood to exclude extraneous light. Such projector apparatus embodies the usual film-supply and take-up reels, but these in the present embodiment are adapted to operate alternatively in accordance with the direction of advance desired; and the film passes beneath a gate in which the picture is suitably framed, and is advanced by a single reversible sprocket member engaging the laterally disposed perforations of the film. Provision is made to rotate this sprocket in either direction, the film feed and take-up reels being provided with clutching devices whereby a reel becomes free-running in one direction of rotation in order to accommodate withdrawal of film strip therefrom or is rotated to accumulate film thereon.

In addition to a motor drive which is intended for rapid advance of the film, provision is also made for an advance by the sprocket under manual control so as to secure a more accurate positioning. In order to admit of the rapid advance resulting from the motor operation, the film gate of the projector is arranged to be lifted from the film prior to any advance of the film strip in order to prevent tearing thereof.

The lifting mechanism is controlled from the manually operated driving mechanism which, in turn, is so interlocked with the high-speed driving mechanism that neither one may be actuated until the gate has first cleared the film strip, thereby insuring against tearing of the same especially at the extremely high velocities when advanced under the motor action.

From the driving sprocket for the film strip there is driven also suitable counter mechanism synchronized with the consecutive frames or frame groups of the film strip so that successive indications on the counter will indicate corresponding consecutive frames or groups of frames of the film, the subject matter of which has been previously indexed with respect to a number thereon. By this expedient, the designating number of the particular subject being known, its frame is rapidly brought into position for projection by first operating the film-advancing mechanism at high speed in the proper direction while viewing the counter until the desired number is approached, whereupon the final desired location is secured by the manual control aforesaid.

The nature of the invention, however, will best be understood when described in connection with the accompanying drawings, in which:

Fig. 5 is a fragmentary horizontal section taken on the line 5—5, Fig. 2 of the drawings, and looking in the direction of the arrows.

Fig. 6 is a fragmentary view showing the mechanism illustrated in Fig. 5 in side elevation.

Figs. 7 and 8 are fragmentary detail views further illustrating the mechanism shown in Fig. 5.

Fig. 9 is a fragmentary elevation illustrating the motor-control rheostat.

Fig. 10 is a longitudinal section illustrating the film-reel drive.

Figure 1:
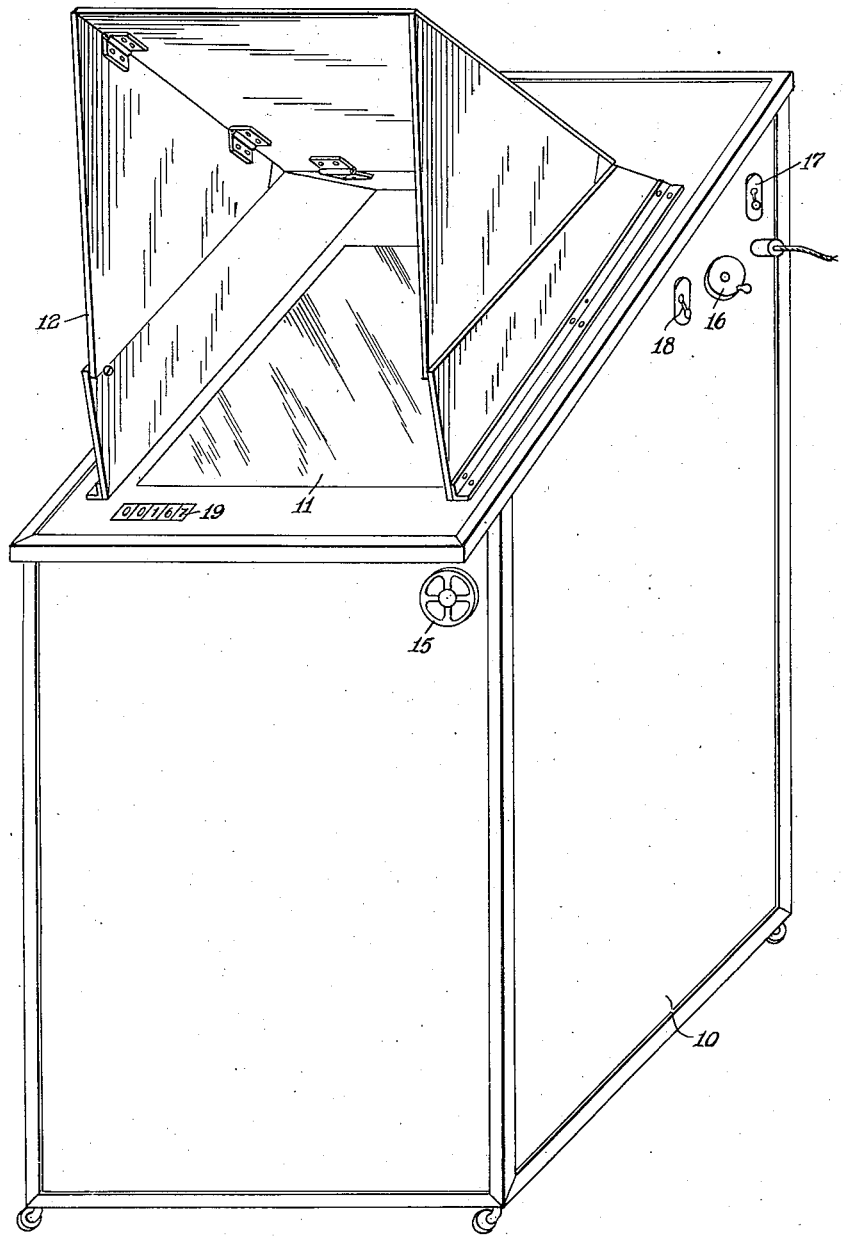
Fig. 1 illustrates in isometric projection one embodiment of the invention.
Figure 2:
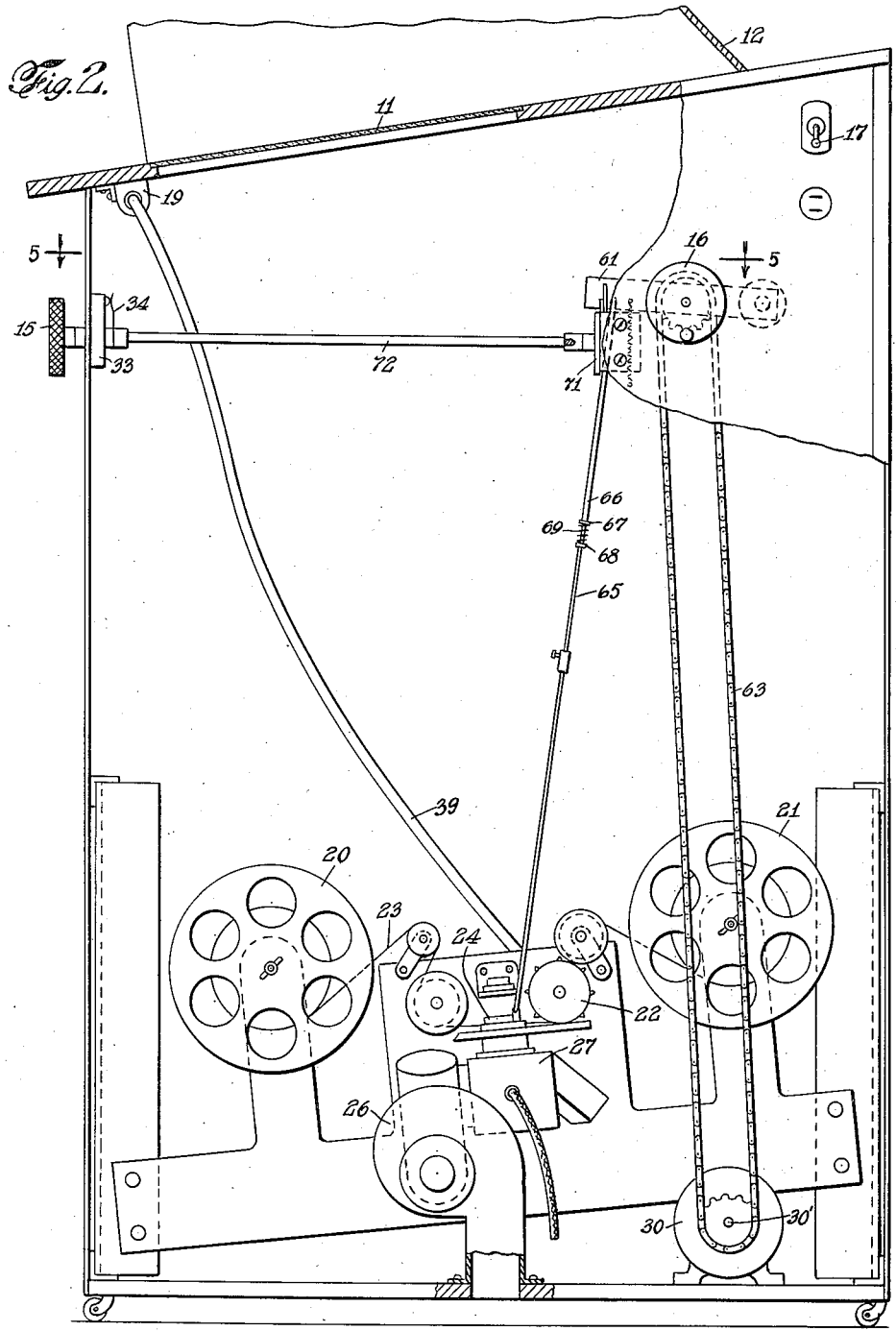
Fig. 2 is a longitudinal section therethrough.
Figure 3:
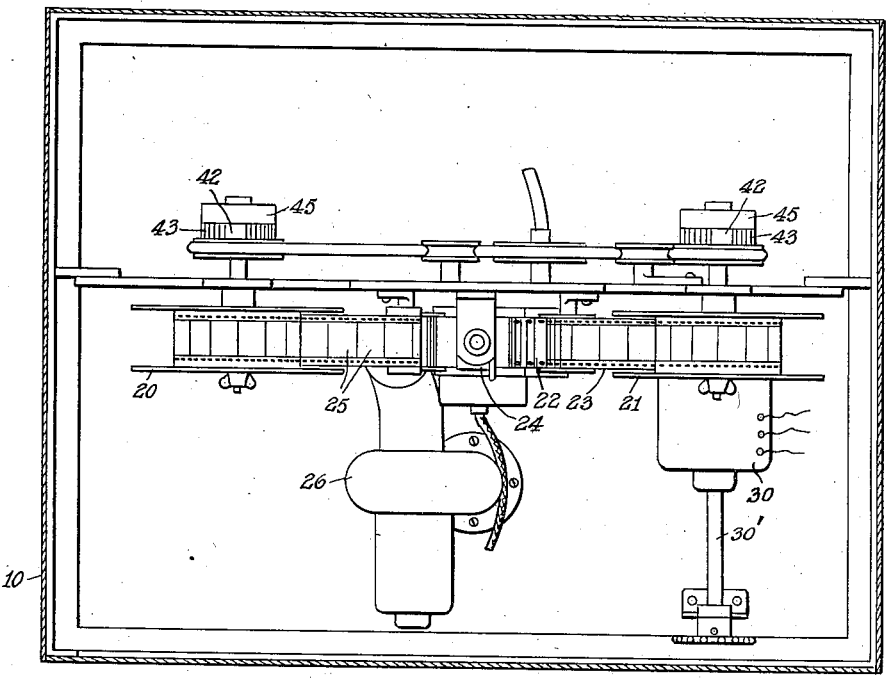
Fig. 3 is a plan view of the mechanism located in the lower portion of the cabinet illustrated in Fig. 1.
Figure 4:
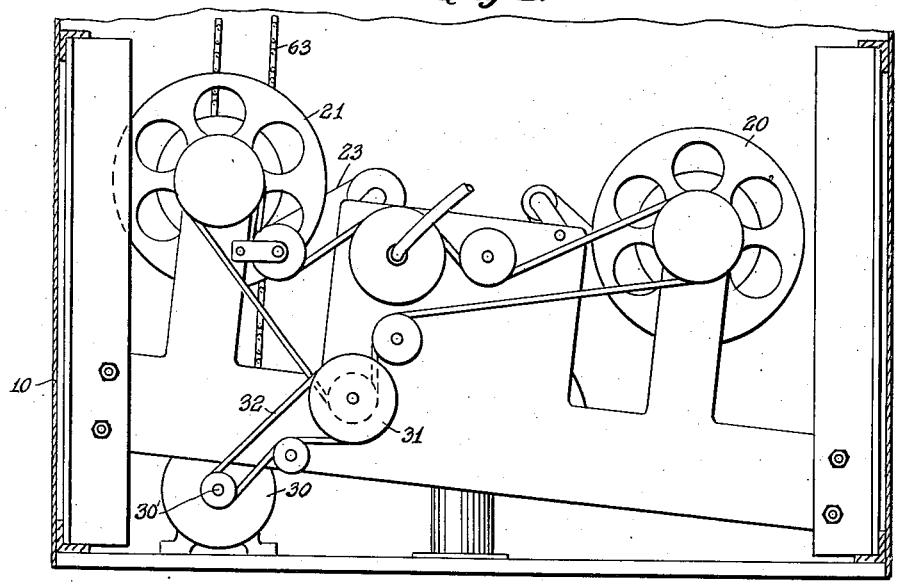
Fig. 4 is a fragmentary side elevation thereof.

Referring to the drawings, 10 designates a cabinet for suitably housing the mechanism constituting the novel projected picture selector and for affording a top to support a suitable screen 11 upon which an image of the selected data may be projected for convenient viewing. A collapsible hood 12 may be provided about this screen and is shown as secured to the top so as to protect the screen against extraneous light rays.

A motor-control element such as the wheel 15 and a manual control element 16 may conveniently be positioned at the front and side, respectively, of the cabinet, as indicated, together with a motor-switch 17 and a lamp switch 18. In addition, there is associated with the cabinet suitable counter mechanism 19 which may conveniently be located at the forward portion of the top, as indicated.

The entire operating mechanism is housed within the cabinet 10, the projector portion being mounted on the bottom thereof and comprising generally film-reels 20 and 21, each of which may be operated alternatively as a feed or supply reel or as a take-up reel, as will hereinafter be more fully set forth. A single film-advancing sprocket 22, as hereinafter set forth, serves to transfer film 23 from one reel and wind it upon the other, and vice versa, in accordance with the direction of rotation of said sprocket. The film 23 passes in the usual manner beneath a hinged gate 24 for properly registering the respective frames 25 of the film with the window of the gate in projecting the matter depicted on a frame by the projector upon the screen 11.

A blower apparatus 26 may be associated with the projector apparatus to maintain the film sufficiently cool when temporarily held in stationary position for projection, it being understood that the pictures when viewed are not thrown continuously upon the screen and that a single picture may be held projected for a considerable period of time when the switch 18 is thrown to energize the illumination means within the lamp house 27.

For driving the sprocket 22, any suitable reversible driving means may be utilized, for example, a reversible electric motor 30 having shaft 30' which is connected to the driving pulley 31 of the projector by belt 32; and the motor 30 is arranged to be controlled from a double rheostat controller 33 shown in detail in Fig. 9 of the drawings. This rheostat comprises the control wheel 15 located externally of the cabinet for convenient access and operates a brush 34 located within the cabinet and normally biased to an "off" position by springs 35 and 36. Brush 34 is designed to move over the respective starting resistances 37 and 38 to complete respective circuits to the motor for running it in one direction or the other.

By correspondingly turning hand-wheel 15, therefore, film may be taken from one reel 20 and wound upon the other 21, or vice versa; and the arrangement is such that this withdrawal is accomplished at a relatively high velocity and, in order that the film may not be torn in passing through the projector, with gate 24 elevated to clear the film. It will be appreciated, also, that at such rapid transfer of film it would not be possible to identify any particular frame which might be projected upon the screen, nor would it be possible to secure a close and accurate registry thereby of a desired frame.

Provision has therefore been made, as in the counter mechanism 19, to synchronize the passage of frames through the projector, or rather past the gate thereof, with the indications of the said counter mechanism. While the frames may, therefore, be passing so rapidly as to be not discernible, by viewing the counter a close approximation of the desired frame may be secured by stopping or slowing down the motor at the proper time. To this end, a flexible shaft 39 connects the film-advancing sprocket 22 with the counter mechanism to cause the latter to rotate synchronously with the former.

To elevate the gate 24, which must be accomplished prior to any rotation of sprocket 22, a connection is had between such gate and the manual control element 16, which element is interlocked also with the motor-control element 15, as will hereinafter be set forth. When the gate is elevated, it will be possible to advance the film through the projector at relatively high velocities without danger of tearing or injuring the same; and as it is necessary to advance the film in either direction, provision must be made whereby each of the reels 20 and 21 must act alternatively both as a take-up and as a feed or supply reel. To this end, reference being had to Fig. 10 of the drawings, the shaft 40 on which the reel 20 is mounted is not connected directly with the driving pulley 41 but through an intermediate clutching mechanism whereby in one direction of rotation of the pulley the reel will be positively advanced and in the other direction no rotation will be communicated to the said shaft 40 for rotating the reel 20 which will then be permitted to rotate freely with said shaft to feed film.

The clutching mechanism may be of any well known or special construction and, as shown, comprises a pawl 42, rotatable with the driving pulley 41 which is freely rotatable on the shaft 40, and designed to engage the teeth of a ratchet wheel 43 also freely rotatable on said shaft. Rotation is transmitted from the ratchet wheel 43 to the shaft through a pair of friction blocks 44 pivoted to the face of the ratchet wheel and adapted to engage the inner face of a flanged transmission drum 45 fixed to said shaft, the blocks being urged outwardly for engagement with the said flange by an intermediate spring element 46 connecting the same. By this expedient, when the ratchet wheel is rotated by pawl 42, rotation will be communicated to the reel 20 to cause it to wind or take up film, whereas when the pawl is running over the teeth of said ratchet wheel, no rotation will be communicated to the said shaft which may, however, rotate to unwind film therefrom; and, through the frictional engagement of the blocks 44 with the drum 45, the unwinding of the reel will be checked sufficiently to prevent any overrunning of the film thereon. It will be understood, of course, that the clutch arrangement of the respective reels 20 and 21 is such that when one clutch is driving, the other will be operating to permit free running of the corresponding reel.

To maintain the gate 24 elevated during the progress of the film through the projector and to effect such elevation prior to any advancing movement of the film, provision has been made to interlock the motor-control element 15 with the manual control element 16, the movement for effecting the elevation of the gate being obtained from a setting of the latter control element.

Thus, reference being had to Figs. 5–8 of the drawings, the manual control element is shown as comprising a disk 50 rotatable, for example, through a handle 51 to rotate a shaft 52 carrying at its outer end a conical tip or head 53. Disk 50 carries upon the inner face of its hub a pin 54 projecting parallel to shaft 52 and designed to engage one of a plurality of sockets 55 of a sleeve 56 rotatable in a bearing 57 which is mounted in the side wall of the cabinet. There is fixed to the said sleeve at its outer end a sprocket wheel 58 which may be rotated through operation of handle 51. This, however, can be effected only when disk 50 has been pushed inwardly through engagement of pin 54 with a socket 55, thus coupling the disk to the sprocket wheel. At the same time, shaft 56 will have been advanced axially with respect to a notch 60 in a bar 61 which is pivoted on a post 62 extending laterally from the wall of the cabinet parallel to said shaft, the bar 61 being swingable in a plane at right angles to said post and shaft and the head 53 of the latter being designed to fit the notch 60. The rotation of sprocket 58 is communicated to the shaft 30' of motor 30 through a suitable sprocket chain or the like 63, so that the film may be advanced manually in either direction by accordingly rotating disk 50 through its handle 51.

As hereinbefore noted, in order to effect this rotation, it is first necessary to push the disk 50 inwardly; but in so doing, head 53 of shaft 52 has been forced inwardly with respect to the notch 60 and has correspondingly tilted the bar 61 against the action of gravity and a return spring 64. This movement is communicated to gate 24 through a suitable connection and whereby the gate will be elevated.

The connection is composed preferably of a rod 65 and tube 66 into which the said rod extends, there being interposed between a flange 67 of the tube and a flange 68 of the rod an expansible spring 69 to insure return of the gate when disk 50 is again retracted to the position indicated in Fig. 8.

In this position, the tip of shaft 56 has been so far retracted that bar 61 is permitted to drop sufficiently, under the action of spring 64 and gravity, that the gate will fully close; and the said tip being of conical form, rotation of the manual control or the rotation imparted to the said shaft 56 through operation of the motor drive will not tend to change the elevated position of the bar 61.

Moreover, when the said bar is in its lowered position, Figs. 7 and 8, it is designed to engage a notch 70 extending radially inwardly from the circumference of a disk 71 carried by the inner end of shaft 72 of the motor-control element 15. This element thus becomes locked against rotation so long as bar 61 is lowered, which will be until disk 50 is forced inwardly to lift the gate 24 as well as to couple the disk for manual operation of the film-advancing means. After being thus set, the motor control 15 may be operated for manipulating the rheostat controller 33 to rapidly bring the desired frame into approximate position while viewing the counter 19; and as the desired frame is approached, the motor control is slowed down or entirely cut out and the frame accurately positioned by manipulating handle 51 until the correct indication shows on the counter. The illumination means as included in the lamp housing 27 is then energized to project the selected picture upon the screen 11.

I claim:

1. Projector apparatus of the nature set forth and including a cabinet, a screen at the top of the cabinet, a projector mounted at the bottom of the cabinet for projecting a picture upon the screen, said projector comprising reversible film-advancing means, a film gate, a supply reel and a take-up reel alternatively freely rotatable or driven in predetermined directions: a motor associated with the projector for driving said film-advancing means in either direction to advance film beneath said gate in the desired direction, together with means externally accessible for effecting operation of the motor and means located at the upper portion of the cabinet and externally accessible to raise the gate from said film, together with means for advancing manually the said driving means, and including an element normally locking the said motor against operation.

2. Projector apparatus of the nature set forth and including a projector and a screen for receiving a picture projected therefrom, said projector comprising reversible film-advancing means, a film gate, a film supply reel and a take-up reel alternatively freely rotatable or driven in predetermined directions: means for driving said film-advancing means in either direction to advance film beneath said gate in the desired direction, and manually operable means for similarly driving said film-advancing means and including a rotatably mounted element connected with said driving means, an axially adjustable manually controlled member externally accessible and adapted for engagement with the rotatable element when axially advanced and terminating in a conical head, a pivoted bar having a notch into which said head extends to elevate the bar and thereby the gate of the projector, and means associated with the driving means adapted for engagement with the bar whereby the driving means will be prevented from operating until said bar is elevated.

3. Projector apparatus of the nature set forth and including a projector and a screen for receiving a picture projected therefrom, said projector comprising reversible film-advancing means, a film gate, a film supply reel and a take-up reel alternatively freely rotatable or driven in predetermined directions: means for driving said film-advancing means in either direction to advance film beneath said gate in the desired direction, and manually operable means for similarly driving said film-advancing means and including a rotatably mounted element connected with said driving means, an axially adjustable manually controlled member externally accessible and adapted for engagement with the rotatable element when axially advanced and terminating in a conical head, a pivoted bar having a notch into which said head extends to elevate the bar, means associated with the driving means adapted for engagement with the bar whereby the driving means will be prevented from operating until said bar is elevated, and a connection between said bar and gate for elevating the latter when the bar is raised.

4. Projector apparatus of the nature set forth and including a projector and a screen for receiving a picture projected therefrom, said projector comprising reversible film-advancing means, a film gate, a film supply reel and a take-up reel alternatively freely rotatable or driven in predetermined directions: a motor for driving said film-advancing means, manually operable means rotatable alternatively in a clockwise direction or in a counter-clockwise direction for determining the direction of rotation of the said motor and film-advancing means, a second manually-operable means for similarly driving said film-advancing means and including a rotatably mounted element connected with said motor and an axially-adjustable, manually-controlled member externally accessible and adapted for engagement with the rotatable element when axially advanced and terminating in a conical head, and a pivoted bar having a notch into which said head extends to elevate the bar, together with means movable with the first-named manually operable means adapted for engagement with said bar whereby the latter locks the first-named manually operable means against rotation in either direction.

5. Projector apparatus of the nature set forth and including a projector and a screen for receiving a picture projected therefrom, said projector comprising reversible film-advancing means, a film gate, a film-supply reel and a take-up reel alternatively freely rotatable or driven in predetermined directions: a motor for driving said film-advancing means, manually operable means rotatable alternatively in a clockwise direction or in a counter-clockwise direction for determining the direction of rotation of the said motor and film-advancing means, a second manually-operable means for similarly driving said film-advancing means and including a rotatably mounted element connected with said motor and an axially-adjustable, manually-controlled member adapted for engagement with the rotatable element when axially advanced and terminating in a conical head, and a pivoted bar having a notch into which said head extends to elevate the bar, together with means movable with the first-named manually operable means adapted for engagement with said bar whereby the latter locks the first-named manually operable means against rotation in either direction, and a connection between said bar and gate for elevating the latter when the bar is raised.

6. Projector apparatus of the nature set forth and including a projector and a screen for receiving a picture projected therefrom, said projector comprising reversible film-advancing means, a countermechanism driven from the film-advancing means and synchronously therewith to register the respective film frames bearing like indicia, a film gate, a film supply reel and a take-up reel alternatively freely rotatable or driven in predetermined directions: a motor for driving said film-advancing means, manually operable means rotatable alternatively in a clockwise direction or in a counter-clockwise direction for determining the direction of rotation of the said motor and film-advancing means, a second manually-operable means for similarly driving said film-advancing means and including a rotatably mounted element connected with said motor and an axially-adjustable, manually-controlled member adapted for engagement with the rotatable element when axially advanced and terminating in a conical head, and a pivoted bar having a notch into which said head extends to elevate the bar, together with means movable with the first-named manually operable means adapted for engagement with said bar whereby the latter locks the first-named manually operable means against rotation in either direction, and a connection between said bar and gate for elevating the latter when the bar is raised.

7. Projector apparatus of the nature set forth and including a projector and a screen for receiving a picture projected therefrom, said projector comprising reversible film-advancing means, a film-supply reel and a take-up reel alternatively freely rotatable or driven in predetermined directions: a motor for driving said film-advancing means, manually operable means for determining the direction of rotation of the said motor and film-advancing means, a second manually-operable means for similarly driving said film-advancing means and including a rotatably mounted element connected with said motor and an axially-adjustable, manually-controlled member adapted for engagement with the rotatable element when axially advanced and terminating in a conical head, and a pivoted bar having a notch into which said head extends to elevate the bar, together with means movable with the first-named manually operable means adapted for engagement with said bar whereby the latter locks the first-named manually operable means against rotation in either direction.

8. Projector apparatus of the nature set forth and including a projector and a screen for receiving a picture projected therefrom, said projector comprising reversible film-advancing means, a film gate, a film-supply reel and a take-up reel alternatively freely rotatable or driven in predetermined directions: a motor for driving said film-advancing means, manually operable means for determining the direction of rotation of the said motor and film-advancing means, a second manually-operable means for similarly driving said film-advancing means and including a rotatably mounted element connected with said motor and an axially-adjustable, manually-controlled member adapted for engagement with the rotatable element when axially advanced and terminating in a conical head, and a pivoted bar having a notch into which said head extends to elevate the bar, together with means movable with the first-named manually operable means adapted for engagement with said bar whereby the latter locks the first-named manually operable means against rotation in either direction, and means operated by the bar for elevating the gate when the bar is raised.

EDWARD S. RINALDY.